(12) United States Patent
Oh et al.

(10) Patent No.: US 10,772,025 B2
(45) Date of Patent: *Sep. 8, 2020

(54) METHOD AND APPARATUS FOR CHANNEL ACCESS IN WIRELESS COMMUNICATION SYSTEM

(71) Applicant: Samsung Electronics Co., Ltd., Suwon-si, Gyeonggi-do (KR)

(72) Inventors: Jinyoung Oh, Seoul (KR); Taehan Bae, Seoul (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,413

(22) Filed: Apr. 5, 2019

(65) Prior Publication Data
US 2019/0239138 A1 Aug. 1, 2019

Related U.S. Application Data

(63) Continuation of application No. 15/429,919, filed on Feb. 10, 2017, now Pat. No. 10,257,764.
(Continued)

(51) Int. Cl.
*H04W 40/04* (2009.01)
*H04W 16/14* (2009.01)
(Continued)

(52) U.S. Cl.
CPC .......... *H04W 40/04* (2013.01); *H04W 16/14* (2013.01); *H04W 74/0808* (2013.01); *H04W 72/1215* (2013.01)

(58) Field of Classification Search
CPC .. H04W 40/04; H04W 74/0808; H04W 16/14
See application file for complete search history.

(56) References Cited

U.S. PATENT DOCUMENTS

2011/0128895 A1* 6/2011 Sadek ................... H04W 16/14
370/280
2014/0036853 A1 2/2014 Kim et al.
(Continued)

FOREIGN PATENT DOCUMENTS

| WO | 2013/006006 A2 | 1/2013 |
| WO | 2015/168028 A1 | 11/2015 |
| WO | 2016/021945 A1 | 2/2016 |

OTHER PUBLICATIONS

"3rd Generation Partnership Project; Technical Specification Group Radio Access Network; Study on Licensed-Assisted Access to Unlicensed Spectrum, (Release 13)", 3GPP Draft; 36889-D00, 3rd Generation Partnership Project (3GPP), Mobile Competence Centre: 650. Route Oes Lucioles; F-06921 Sophia-Antipolis Cedex , France, Jun. 30, 2015 (Jun. 30, 2015), XP050985895.
(Continued)

*Primary Examiner* — Robert C Scheibel
(74) *Attorney, Agent, or Firm* — Jefferson IP Law, LLP

(57) ABSTRACT

A communication method for a channel access in a wireless communication system and an apparatus therefor are provided. The communication method includes an evolved NodeB (eNB) that transmits data to a user equipment (UE) through a licensed band, and determines whether an unlicensed band channel is in an idle state during a first channel sensing duration. If the unlicensed band channel is in the idle state, the eNB transmits data to the UE through an unlicensed band during a first channel occupying duration, a second channel sensing duration, and a second channel occupying duration. In the method, a sum of the first channel occupying duration, the second channel sensing duration, and the second channel occupying duration is equal to or less than a certain time.

20 Claims, 7 Drawing Sheets

Related U.S. Application Data

(60) Provisional application No. 62/295,476, filed on Feb. 15, 2016.

(51) Int. Cl.
*H04W 74/08* (2009.01)
*H04W 72/12* (2009.01)

(56) References Cited

U.S. PATENT DOCUMENTS

| | | | |
|---|---|---|---|
| 2014/0112289 A1 | 4/2014 | Kim et al. | |
| 2015/0341962 A1 | 11/2015 | Zou et al. | |
| 2016/0338104 A1* | 11/2016 | Yin | H04W 72/0446 |
| 2017/0034851 A1 | 2/2017 | Kwon et al. | |
| 2017/0055296 A1* | 2/2017 | Cheng | H04W 74/0808 |
| 2017/0202018 A1* | 7/2017 | Cha | H04W 74/0816 |
| 2017/0231013 A1 | 8/2017 | Ann et al. | |
| 2017/0257773 A1* | 9/2017 | Boudreau | G01S 7/021 |
| 2017/0318607 A1* | 11/2017 | Tiirola | H04W 74/0808 |
| 2017/0339717 A1* | 11/2017 | Futaki | H04W 16/14 |
| 2017/0373780 A1* | 12/2017 | Ahn | H04J 11/0023 |
| 2018/0115981 A1* | 4/2018 | Kim | H04W 74/0808 |

OTHER PUBLICATIONS

Huawei et al: "LBT Functionality and Protocol Impact", 3GPP Draft; R2-150248, 3rd Generation Partnership Project (3GPP), Mobile Competence Centre; 650, Route Oes Lucioles; F-06921 Sophia-Antipolis Cedex , France, vol. Ran WG2, No. Athens, Greece, Feb. 9, 2015-Feb. 12, 2015 Feb. 8, 2015 (Feb. 8, 2015), XP050935574.

LG Electronics: "DL/UL solutions of LAA with LBT", 3GPP Draft; R1-150214 LAA LBT Proposal, 3rd Generation Partnership Project (3GPP), Mobile Competence Centre; 650, Route Des Lucioles : F-06921 Sophia-Antipolis Cedex ; France, vol. RAN WG1, No. Athens, Greece, Feb. 9, 2015-Feb. 13, 2015 Feb. 8, 2015 (Feb. 8, 2015), XP050933428.

Ericsson: "On Remaining Details of DL LAA LBT Procedures and Parameters", 3GPP Draft; R1-157257, 3rd Generation Partnership Project (3GPP), Mobile Competence Centre , 650. Route Des Lucioles : F-06921 Sophia-Antipolis Cedex ; France, vol. RAN WG1, No. Anahei, USA; Nov. 16, 2015-Nov. 20, 2015, Nov. 15, 2015, (Nov. 15, 2015), XP051003469.

Extended European Search Report dated Dec. 12, 2018, issued in European Application No. 17753418.7.

* cited by examiner

METHOD AND APPARATUS FOR CHANNEL ACCESS IN WIRELESS COMMUNICATION SYSTEM

CROSS-REFERENCE TO RELATED APPLICATION(S)

This application is a continuation application of prior application Ser. No. 15/429,919, filed on Feb. 10, 2017, which has issued as U.S. Pat. No. 10,257,764 on Apr. 9, 2019 and was based on and claims the benefit under 35 U.S.C. § 119(e) of a U.S. Provisional application filed on Feb. 15, 2016 in the U.S. Patent and Trademark Office and assigned Ser. No. 62/295,476, the entire disclosure of which is hereby incorporated by reference.

TECHNICAL FIELD

The present disclosure relates to a method and apparatus for a channel access in a wireless communication system.

BACKGROUND

A recent mobile communication system is evolving into a high-speed and high-quality wireless packet data communication system for providing a data service and a multimedia service, outgrowing an initial voice-oriented service. In order to support such a high-speed and high-quality wireless packet data transfer service, various mobile communication standards such as high speed downlink packet access (HSDPA), high speed uplink packet access (HSUPA), long term evolution (LTE), and LTE advanced (LTE-A) of 3rd generation partnership project (3GPP), high rate packet data (HRPD) of 3GPP2, and 802.16 of Institute of Electrical and Electronics Engineers (IEEE) have been developed. In particular, LTE/LTE-A/LTE-A Pro (hereinafter LTE) continues to develop and evolve standards to improve system capacity and frequency efficiency.

Typically, the LTE system can greatly increase a data transfer rate and system capacity by using carrier aggregation (CA) technology capable of operating the system using a plurality of frequency bands. In addition, the frequency band currently used in the LTE system is generally a licensed band (licensed spectrum or licensed carrier) used by an operator having authority.

However, since a typical frequency band (e.g., a frequency band of 5 GHz or less) that provides a mobile communication service has been already occupied by another operator or another communication system, an operator may often fail to obtain a number of licensed band frequencies and thus have difficulty in expanding the system capacity by using the CA technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method in which a user equipment (UE) transmits an uplink data channel through one or more uplink subframes by using uplink transmission setting information received from an evolved NodeB (eNB).

However, the present disclosure is not limited to the above aspects, and any other aspect, even though not mentioned herein, may be well understood from the following description.

Another aspect of the present disclosure is to provide a method in which the UE transmits an uplink data channel through one or more uplink subframes by using uplink transmission setting information received from the eNB in case of transmitting the uplink data channel at an unlicensed band.

Additionally, an embodiment of the present disclosure includes, if a maximum occupancy time of the eNB or the UE defined at a channel access priority is greater than a time defined by a regional or national regulation in a mobile communication system that operates in an unlicensed band, determining that an unlicensed band channel is an idle channel, through a channel sensing operation performed during a channel sensing duration established according to the channel access priority, occupying the channel during the time defined by the regional or national regulation, and further occupying the channel through an additional channel sensing duration.

In accordance with an aspect of the present disclosure, a communication method of eNB is provided. The method includes transmitting data to UE through a licensed band, determining whether an unlicensed band channel of an unlicensed band is in an idle state during a first channel sensing duration, and if the unlicensed band channel is in the idle state, transmitting data to the UE through the unlicensed band during a first channel occupying duration, a second channel sensing duration, and a second channel occupying duration. In this method, a sum of the first channel occupying duration, the second channel sensing duration, and the second channel occupying duration may be equal to or less than a certain time.

In the method, the certain time may be determined, based on a rounding value of a result of a calculation between a maximum occupancy time for the eNB or the UE to occupy the unlicensed band and an actual occupancy time for the eNB or the UE to occupy the unlicensed band.

In the method, the calculation may include dividing the maximum occupancy time by the actual occupancy time and then subtracting one.

In the method, the certain time may be determined according to $1000 \cdot T_{mcot} + \text{ceil}(T_{mcot}/T_j - 1) \cdot T_{js}$ (us) in which $T_{mcot}$ denotes a maximum occupancy time for the eNB or the UE to occupy the unlicensed band, $T_j$ denotes an actual occupancy time for the eNB or the UE to occupy the unlicensed band, and $T_{js}$ denotes a length of the second channel sensing duration.

In the method, the second channel sensing duration may include an idle slot duration having 16 us and two channel sensing slot durations each having 9 us.

In accordance with another aspect of the present disclosure, a communication method of UE is provided. The method includes receiving data from eNB through a licensed band, and if an unlicensed band channel of an unlicensed band is in an idle state during a first channel sensing duration, receiving data from the eNB through the unlicensed band during a first channel occupying duration, a second channel sensing duration, and a second channel occupying duration. In this method, a sum of the first channel occupying duration, the second channel sensing duration, and the second channel occupying duration may be equal to or less than a certain time.

In accordance with another aspect of the present disclosure, an eNB is provided. The eNB includes a transceiver configured to transmit or receive a signal, and a controller configured to control the transceiver to transmit data to UE through a licensed band, to determine whether an unlicensed band channel of an unlicensed band is in an idle state during a first channel sensing duration, and if the unlicensed band channel is in the idle state, to control the transceiver to transmit data to the UE through the unlicensed band during a first channel occupying duration, a second channel sensing duration, and a second channel occupying duration. In this eNB, a sum of the first channel occupying duration, the second channel sensing duration, and the second channel occupying duration may be equal to or less than a certain time.

In accordance with another aspect of the present disclosure, a UE is provided. The UE includes a transceiver configured to transmit and/or receive a signal, and a controller configured to control the transceiver to receive data from eNB through a licensed band, and if an unlicensed band channel of an unlicensed band is in an idle state during a first channel sensing duration, to control the transceiver to receive data from the eNB through the unlicensed band during a first channel occupying duration, a second channel sensing duration, and a second channel occupying duration. In this UE, a sum of the first channel occupying duration, the second channel sensing duration, and the second channel occupying duration may be equal to or less than a certain time.

According to the present disclosure, it is possible to effectively perform a channel occupancy operation for using an unlicensed band and also improve coexistence performance between devices using the unlicensed band by clearly setting a threshold as to the channel occupancy operation.

In accordance with another aspect of the present disclosure, a method in which UE transmits an uplink data channel through one or more uplink subframes by using uplink transmission setting information received from eNB is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
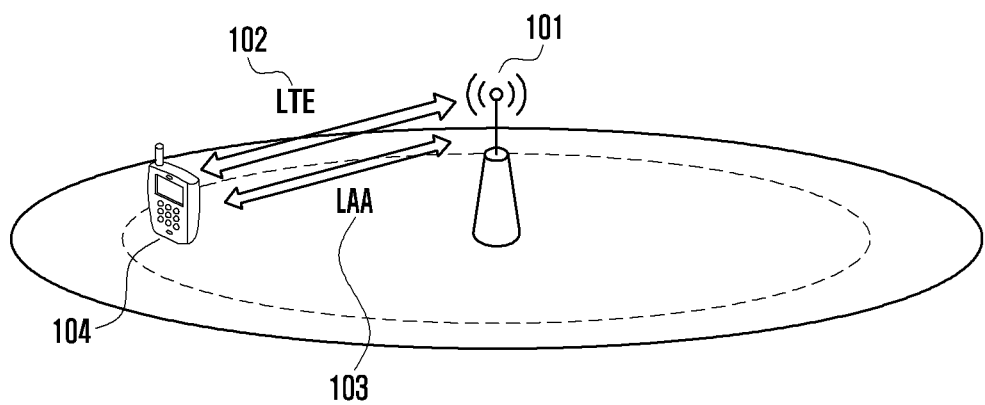
FIGS. 1 and 2 are diagrams illustrating a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and configurations may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements are exaggerated, omitted or schematically shown in the accompanying drawings. Also, the size of each element does not entirely reflect the actual size. In the drawings, the same or corresponding elements are denoted by the same reference numerals.

The advantages and features of the present disclosure and the manner of achieving them will become apparent with reference to the embodiments described in detail below with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. To fully disclose the scope of the present disclosure to those skilled in the art, and the present disclosure is only defined by the scope of the claims. Like reference numerals refer to like elements throughout the specification.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Hereinafter, a long term evolution (LTE) system and an LTE-advanced (LTE-A) system are exemplified in the present description, but the present disclosure may be applied to any other communication system using a licensed band (also referred to as a licensed spectrum or a licensed carrier) and an unlicensed band (also referred to as an unlicensed spectrum or an unlicensed carrier) without adding or subtracting.

In general, the frequency band that is currently used in the LTE system is the licensed band used by an operator having authority. However, since a typical frequency band (e.g., a frequency band of 5 GHz or less) that provides a mobile communication service has been already occupied by another operator or another communication system, an operator may often fail to obtain a number of licensed band frequencies and thus have difficulty in expanding the system capacity by using the carrier aggregation (CA) technology.

Therefore, in order to process rapidly increasing mobile data in an environment where it is difficult to secure a license band frequency as described above, a technique for utilizing an LTE system in an unlicensed band (unlicensed spectrum or unlicensed carrier) has been recently studied (e.g., LTE in unlicensed (LTE-U), licensed-assisted access (LAA)). In particular, since the 5 GHz band in the unlicensed band is used by a relatively small number of communication devices in comparison with the 2.4 GHz unlicensed band and allows the utilization of a very wide bandwidth, it is relatively easy to acquire an additional frequency band. In other words, using LTE technology that integrates and uses multiple frequency bands, namely, the CA technology, allows the utilization of licensed band and unlicensed band frequencies. In other words, by setting the LTE cell in the licensed band to PCell (or Pcell) and setting the LTE cell (LAA cell or LTE-U cell) in the unlicensed band to SCell (or S cell or LAA SCell) by using the existing CA technology, the LTE system can be operated in the licensed and unlicensed bands. In this case, this system can be applied not only to a CA environment in which an ideal backhaul connects the licensed and unlicensed bands, but also to a dual-connectivity environment in which a non-ideal backhaul connects the licensed and unlicensed bands.

Normally, the LTE/LTE-A system transmits data using an orthogonal frequency division multiple (OFDM) access transmission scheme. In the OFDM scheme, a modulated signal is located in two-dimensional resources composed of time and frequency. The resources on the time axis are distinguished by different OFDM symbols, which are orthogonal to each other. The resources on the frequency axis are distinguished by different subcarriers, which are also orthogonal to each other. That is, in the OFDM scheme, by designating a specific OFDM symbol on the time axis and designating a specific subcarrier on the frequency axis, a single minimum unit resource referred to as a resource element (RE) can be indicated. Different REs have characteristics orthogonal to each other even though passing through a frequency selective channel, so that signals transmitted in different REs can be received at the receiving side theoretically without mutual interference. In the OFDM-based LTE communication system using a normal CP, a downlink bandwidth consists of a plurality of resource blocks (RBs), and each physical resource block (PRB) may be composed of 12 subcarriers arranged along the frequency axis and 14 or 12 OFDM symbols arranged along the time axis. Here, the PRB is a basic unit of resource allocation.

A reference signal (RS) received from evolved node B (eNB) is a signal that enables user equipment (UE) to perform channel estimation and, in the LTE communication system, includes a common reference signal (CRS) and a demodulation reference signal (DMRS) as one of dedicated reference signals. The CRS which is a reference signal transmitted over the entire downlink band can be received by all UEs and is used for channel estimation, feedback information configuration of UE, or demodulation of a control channel and a data channel. The DMRS which is also a reference signal transmitted over the entire downlink band is used for channel estimation and data channel demodulation of specific UE and, unlike CRS, is not used for feedback information configuration. Therefore, the DMRS is transmitted through the PRB resource to be scheduled by the UE.

A subframe on the time axis is composed of two slots of 0.5 ms length, i.e., the first slot and the second slot. A physical dedicated control channel (PDCCH) region, which is a control channel region, and an enhanced PDCCH (ePDCCH) region, which is a data channel region, are divided and transmitted on the time axis. This is for quickly receiving and demodulating a control channel signal. In addition, the PDCCH region is located over the entire downlink band, and one control channel is divided into control channels having smaller units and distributed in the entire downlink band. The uplink is divided into a control channel (PUCCH) and a data channel (PUSCH). A response channel and the other feedback information for the downlink data channel are transmitted through the control channel if there is no data channel and to the data channel if there is the data channel.

Figure 2:
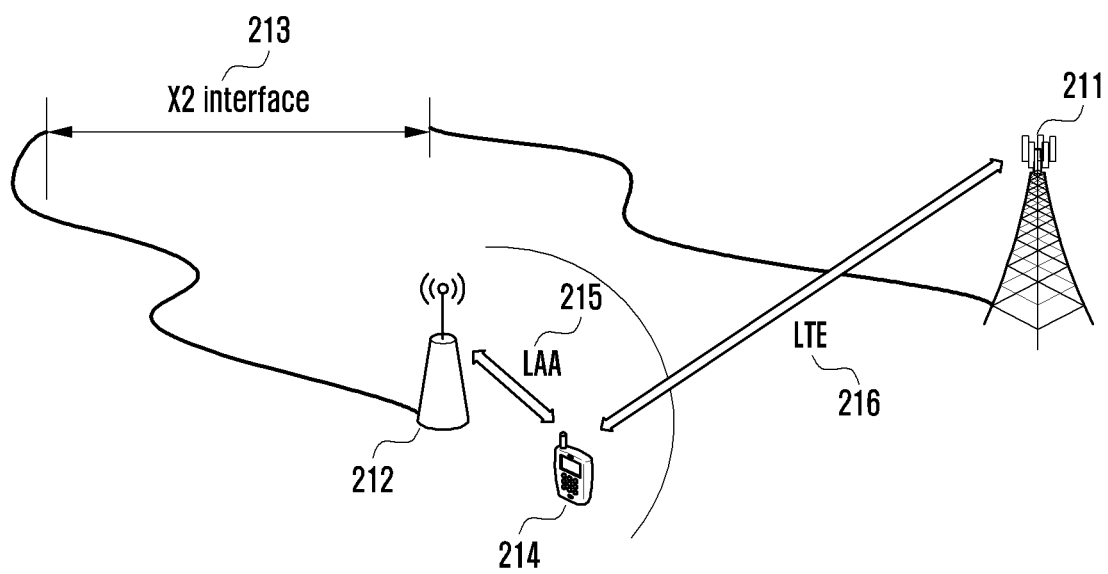

FIGS. 1 and 2 are diagrams illustrating a communication system according to an embodiment of the present disclosure.

Referring to FIGS. 1 and 2, FIG. 1 shows a case where an LTE cell 102 and an LAA cell 103 coexist in a small eNB 101 in the network. UE 104 transmits and receives data to and from the eNB 101 through the LTE cell 102 and the LAA cell 103. There is no restriction on the duplex scheme of the LTE cell 102 or the LAA cell 103. It may be supposed that a cell which performs data transmission/reception operation using a licensed band is the LTE cell 102 or PCell and that a cell which performs data transmission/reception operation using an unlicensed band is the LAA cell 103 or SCell. Although the uplink transmission may be limited to only transmission through the LTE cell 102 when the LTE cell is PCell, the uplink transmission through the LAA cell 103 is also possible.

FIG. 2 shows an LTE macro eNB 211 for wide coverage and an LAA small eNB 212 for an increase in data transmission installed in the network. In this case, there is no restriction on the duplex scheme of the LTE macro eNB 211 or the LAA small eNB 212. In this case, the LTE macro eNB 211 may be replaced with an LTE small eNB (not shown). In addition, the uplink transmission may be set to be performed only through the LTE macro eNB 211 when the LTE eNB is a PCell. At this time, it may be supposed that the LTE macro eNB 211 and the LAA small eNB 212 have ideal backhaul networks. In this case, faster X2 communication (X2 interface) 213 between eNBs is allowed, so that the LAA small eNB 212 can receive in real time related control information from the LTE macro eNB 211 through the X2 communication 213 even though the uplink transmission is performed only to the LTE macro eNB 211. If there is a non-ideal backhaul network between the LTE macro eNB 211 and the LAA small eNB 212, the uplink transmission of the UE 214 may be allowed through the LAA small eNB 212 because the faster X2 communication 213 is impossible. Proposals of the present disclosure are applicable to both the system of FIG. 1 and the system of FIG. 2. In FIG. 2, the LAA cell 215 and the LTE cell 216 are shown in relation to the UE 214.

Meanwhile, a channel sensing operation defined as to transmission of a downlink data channel in the current LTE standard will be described as follows, for example.

Figure 3:
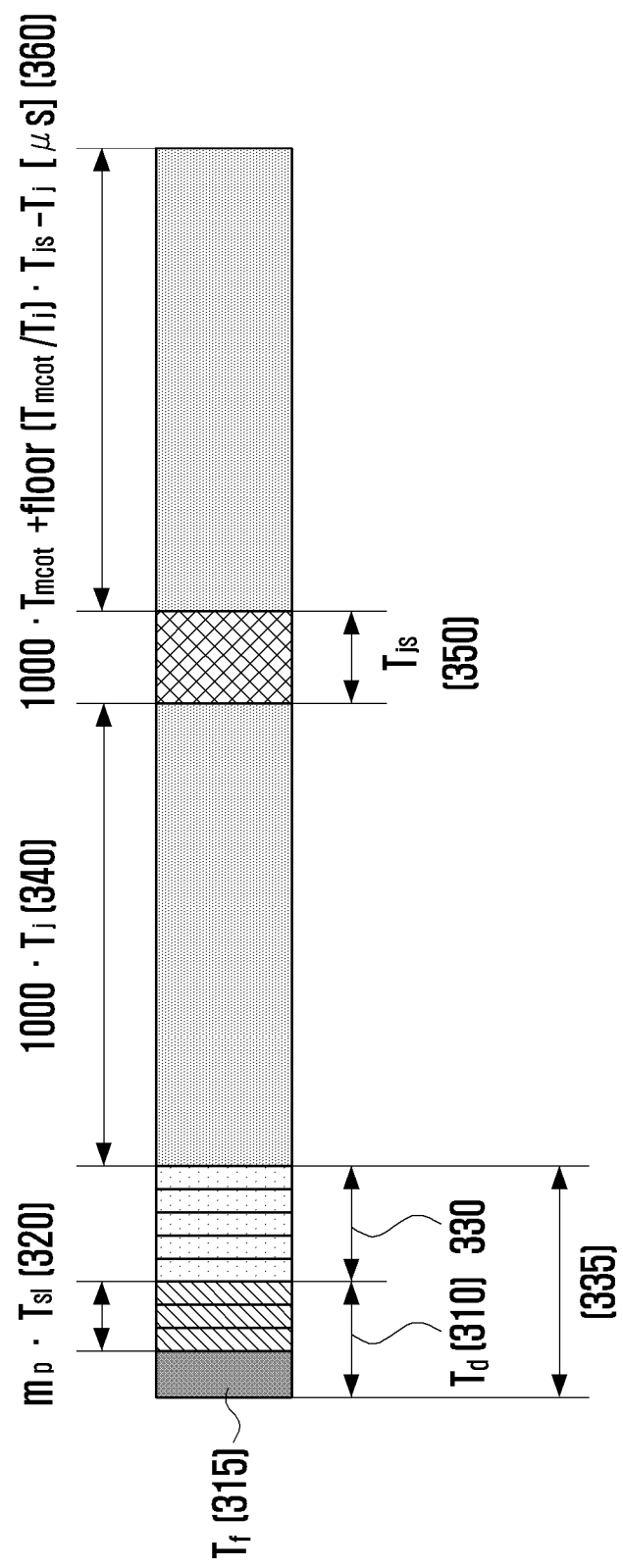
FIG. 3 is a diagram illustrating a channel access scheme in the long term evolution (LTE) standard according to an embodiment of the present disclosure.

FIG. 3 is a diagram illustrating a channel access scheme in the LTE standard according to an embodiment of the present disclosure.

Figure 4:
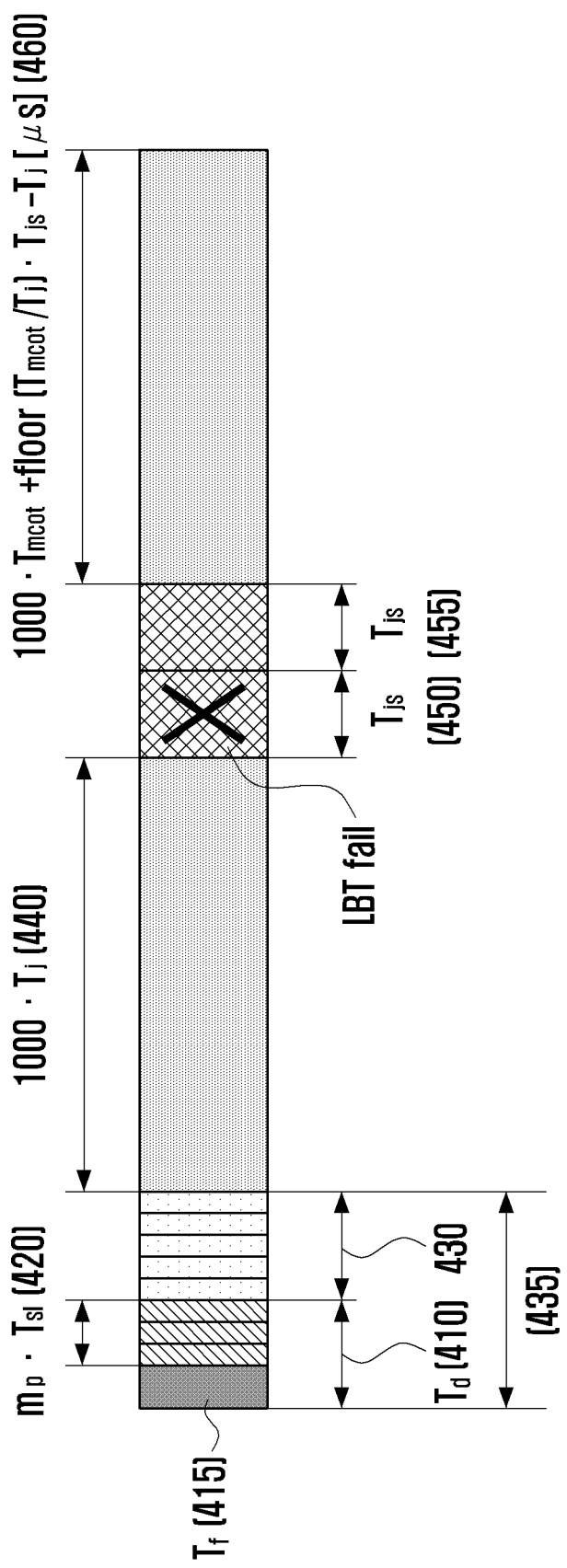
FIG. 4 is a diagram illustrating a problem of a channel access scheme in the LTE standard according to an embodiment of the present disclosure.

FIG. 4 is a diagram illustrating a problem of a channel access scheme in the LTE standard according to an embodiment of the present disclosure.

Referring to FIG. 3, in order to transmit a downlink control channel and a data channel to at least one UE through an unlicensed band channel, a resource access technique such as listen-before-talk (LBT) unlike the existing licensed band should be considered. Namely, the eNB that desires to transmit a downlink control channel and a data channel to at least one UE through an unlicensed band channel may determine whether the channel is in an idle state during at least one defer duration ($T_d$) 310 and N additional channel sensing slots ($T_{sl}$) 330. If it is determined that the channel is in an idle state during the at least one defer duration 310 and N additional channel sensing slots 330, the eNB may occupy the unlicensed band channel and transmit the downlink channel 340 and 360.

In this case, the defer duration 310 and the additional channel sensing slot 330 may be defined differently according to a channel access priority class (p) of the data channel to be transmitted. Namely, the defer duration 310 and the additional channel sensing slot 330 may be defined depending on channel sensing and occupying durations according to the channel access priority class in Table 1 provided below. For example, the defer duration 310 may be formed of an idle slot duration ($T_f$) 315 and additional $m_p$ channel sensing slots 320. In this case, the idle slot duration 315 may have at least 16 us in time. Also, each of the channel sensing slots 320 may be defined as at least 9 us. For example, when the channel access priority class (p) is 3 in Table 1, the defer duration ($T_d$) 310 which is the sum of the idle slot duration ($T_f$) 315 and the $m_p$ channel sensing slots ($m_p * T_{sl}$) 320 may be set to 43 us (i.e., 16 us ($T_f$)+3*9 us ($m_p * T_{sl}$)).

The number (N) of the additional channel sensing slots 330 is a value uniformly and randomly selected within a contention window size ($CW_p$) with respect to the channel access priority (p) in Table 1. Namely, N is a value arbitrarily selected between 0 and the contention window size ($CW_p$). At this time, the contention window size ($CW_p$) may be equal to or greater than the minimum contention window size ($CW_{min,p}$) and equal to or smaller than the maximum contention window size ($CW_{max,p}$) (namely, $CW_{min,p} \leq CW_p \leq CW_{max,p}$). For example, when the channel access priority class (p) is 3, the contention window size ($CW_p$) is selected between the minimum contention window size ($CW_{min,p}$), 15, and the maximum contention window size ($CW_{max,p}$), 63, and may be one of 15, 31 and 63.

TABLE 1

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If the size of a signal received during the channel sensing duration 335 formed of the at least one defer duration 310 and the N additional channel sensing slots 330 does not exceed an energy detection threshold ($X_{thresh}$), e.g., −62 dBm, the eNB may determine that the channel is in an idle state. Then the eNB may transmit a downlink control channel and a data channel to the UE through the channel 340 and 360 determined as being in an idle state. At this time, the threshold used for determining, depending on the size of a received signal, that the unlicensed band channel is an idle channel may be set differently using one or more of the type of a signal/channel to be transmitted, a bandwidth for transmission, and transmission power. For example, in case of low transmission power, the energy detection threshold which is relatively higher than in case of high transmission power may be applied to determine an idle state of the unlicensed band channel. If the size of a signal received by the eNB during the channel sensing duration 335 which is set according to the channel access priority class does not exceed the above threshold ($X_{thresh}$), the eNB may continuously occupy and use the unlicensed band channel 340, 360 determined as an idle state during the maximum channel occupancy duration or time ($T_{mcot}$ or $T_{mcot,p}$) which is set according to the channel access priority class (p). For example, if the eNB determines that the unlicensed band is in an idle state during the channel sensing duration 335 as to the channel access priority class (p) 3 in Table 1, the eNB may continuously occupy the channel without any channel sensing operation for 8 ms maximally.

In the above embodiment of the present disclosure, the maximum occupancy time ($T_{mcot,p}$) may be set differently according to frequency bands or regionally or nationally defined regulations. For example, in case of Japan, the maximum occupancy time ($T_j$) in the unlicensed band of 5 GHz band is currently regulated to 4 ms. On the other hand, in case of Europe, it is possible to continuously occupy and use the channel up to 10 ms or 13 ms. Therefore, if the maximum occupancy time ($T_{mcot,p}$) of the eNB or UE like the channel access priority class (p) 3 in Table 1 is greater than the time defined by the regulations, the eNB or UE cannot use the channel during the maximum occupancy time ($T_{mcot,p}$) defined at the channel access priority class. Accordingly, channel sensing and accessing operations defined in the current LTE standard in order to solve the above problem may be as follows (for example, in view of the eNB, the case of Japan, and the channel access priority class 3).

According to the channel access priority class (p) 3, the defer duration ($T_d$) 310 may be formed of at least 16 us time and three channel sensing slots 320. Also, the number (N) of additional channel sensing slots 330 is randomly selected from one of the contention window sizes {15, 31, 63} allowed in the channel access priority class (p) 3. In this case, the contention window size ($CW_p$) used for determining the number of additional channel sensing slots 330 may be selected as one of the allowed contention window sizes {15, 31, 63} (allowed $CW_p$ sizes) in the channel access priority class (p) 3, depending on the result hybrid automatic repeat request-acknowledgement (HARQ-ACK) or hybrid automatic repeat request-negative acknowledgement (HARQ-NACK)) of reception of a data channel from the eNB or UE. Namely, if the size of a signal received during the channel sensing duration 335 formed of the defer duration 310 set according to the channel access priority class (p) 3 and the N additional channel sensing slots 330 does not exceed the energy detection threshold ($X_{thresh}$), e.g., −62 dBm, the eNB that desires to transmit a downlink control channel and a data channel to at least one UE through an unlicensed band channel may determine that the channel is in an idle state. Then the eNB may transmit a downlink control channel and a data channel through the channel determined as being in an idle state without any channel sensing operation for a time ($T_j$=4 ms for Japan) defined according to a region or nation.

In this case, if the maximum occupancy time ($T_{mcot,p}$=8 ms or $T_{mcot,p}$=10 ms) of the eNB or UE defined in the channel access priority class (p) (i.e., the maximum occupancy time which allows the eNB or the UE to maximally occupy an unlicensed band) is greater than the time ($T_j$=4 ms) defined by the regional or national regulation (i.e., an actual occupancy time which allows the eNB or the UE to actually occupy an unlicensed band), the eNB may perform channel transmission during the time 340 ($T_j$=4 ms) defined by the regional or national regulation. Then the eNB may perform again a channel sensing operation in the additional channel sensing duration 350 ($T_{js}$=34 us). If the size of a signal received during the channel sensing duration 350 does not exceed the energy detection threshold ($X_{thresh}$), e.g., −62 dBm, the eNB may determine that the channel is in an idle state. Also, the eNB may further occupy the channel during the additional channel occupying time 360. In this case, after the unlicensed band channel is determined as an idle channel in the channel sensing duration 335 according to the channel access priority class (p), the sum of the initial channel occupancy time 340, the additional channel sensing duration 350 and the additional channel occupancy time 360 cannot exceed 1000·$T_{mcot}$+floor($T_{mcot}/T_j$)·$T_{js}$ (us).

According to the scheme, defined in the LTE standard, if the maximum occupancy time ($T_{mcot,p}$) of the eNB or UE defined in the channel access priority class (p) is 8 ms ($T_{mcot,p}$=8 ms) and if the maximum occupancy time ($T_{mcot,p}$) is greater than the time ($T_j$=4 ms) defined by the regional or national regulation, the sum of the initial channel occupancy time 340, the additional channel sensing duration 350 and the additional channel occupancy time 360 after the unlicensed band channel is determined as an idle channel in the channel sensing duration 335 according to the channel access priority class (p) becomes 1000·$T_{mcot}$+floor($T_{mcot}/T_j$)·$T_{js}$=8 ms+68 us. Namely, the sum of the initial channel occupancy time 340, the additional channel sensing duration 350 and the additional channel occupancy time 360 is 1000·$T_{mcot}$+floor($T_{mcot}/T_j$)·$T_{js}$, which is obtained as 1000*8 (us)+floor(8/4)*34 (us), namely, 8000+2*34 (us). Therefore, the additional channel sensing duration ($T_{js}$) has two sections each having the length of 34 us or has one section having the length of 68 us.

In other words, according to the scheme, defined in the LTE standard, if the maximum occupancy time ($T_{mcot,p}$=8 ms or $T_{mcot,p}$=10 ms) of the eNB or UE is greater than the time ($T_j$=4 ms) defined by the regional or national regulation, the eNB performs channel transmission during the time 340 ($T_j$=4 ms) defined by the regional or national regulation and performs again a channel sensing operation during the additional channel sensing duration ($T_{js}$) having the length of 34 us. In addition, if the maximum occupancy time ($T_{mcot,p}$) of the eNB or UE is 8 ms and if the time ($T_j$) defined by the regional or national regulation is 4 ms or the like, the eNB performs again the channel sensing operation during two additional channel sensing durations ($T_{js}$) each having the length of 34 us or one additional channel sensing duration ($T_{js}$) having the length of 68 us.

Referring to FIG. 4, according to the currently defined LTE standard, even though it is determined that the channel is not an idle channel in the first additional channel sensing duration 450 after the initial channel occupancy time 440 as shown in FIG. 4, the eNB may further perform a channel sensing operation through the second additional channel sensing duration 455. The defer duration 410 may be formed of an idle slot duration ($T_f$) 415 and additional $m_p$ channel sensing slots 420, as illustrated in FIG. 4.

Namely, if the size of a signal received during the channel sensing duration 435 including the defer duration 410 and the N additional channel sensing slots 430 is equal to or smaller than a predetermined threshold such as an energy detection threshold ($X_{thresh}$), the eNB may determine that the channel is in an idle state. Then the eNB may transmit a downlink control channel and a data channel to the UE through the channel determined as being in an idle state. The transmission time may be possible up to the maximum occupancy time ($T_{mcot,p}$) of the eNB or UE defined in the channel access priority class (p). However, if the maximum occupancy time ($T_{mcot,p}$) of the eNB or UE defined in the channel access priority class (p) is greater than the time ($T_j$) defined by the regional or national regulation, the eNB may occupy and use the channel during the initial channel occupancy time 440 which corresponds to the time ($T_j$) defined by the regional or national regulation. Also, the eNB may perform again a channel sensing operation during the additional channel sensing durations 450 and 455 and, if the size of a signal received during the additional channel sensing durations 450 an 455 is equal to or smaller than the threshold ($X_{thresh}$), determine that the channel is in an idle state. Then the eNB may occupy and use the channel during the additional channel occupancy time 460. In this case, if it is defined that the sum of the initial channel occupancy time 440, the additional channel sensing durations 450 and 455 and the additional channel occupancy time 460 cannot exceed $1000 \cdot T_{mcot} + \text{floor}(T_{mcot}/T_j) \cdot T_{js}$ (us), the additional channel sensing duration ($T_{js}$) may include two sections 450 and 455 each of which has the length of 34 us as discussed above. Thus, even though the first additional channel sensing duration 450 after the initial channel occupancy time 440 is not an idle channel, the eNB may further perform the channel sensing operation through the second additional channel sensing duration 455.

Figure 5:
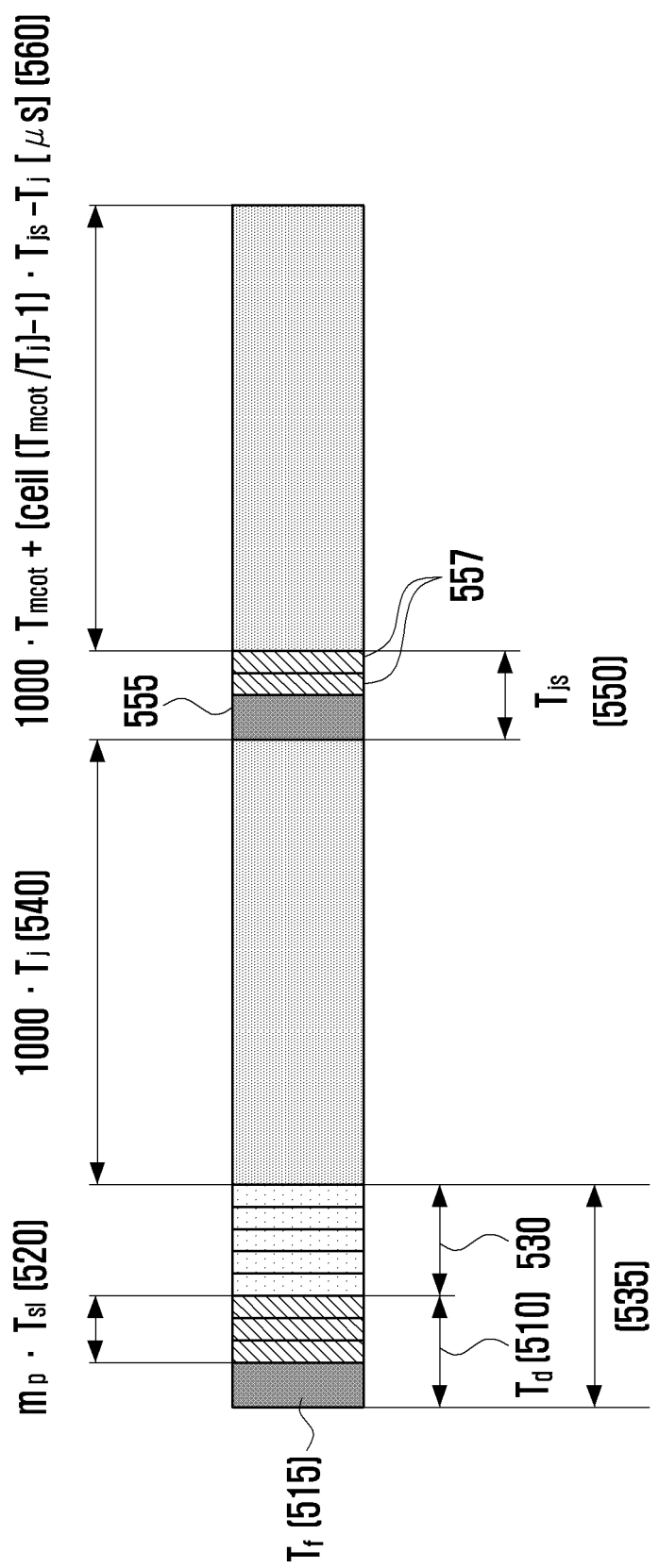
FIG. 5 is a diagram illustrating a channel access scheme according to an embodiment of the present disclosure.

FIG. 5 is a diagram illustrating a channel access scheme according to an embodiment of the present disclosure.

Referring to FIG. 5, in order to solve the above problem in an embodiment of the present disclosure, if the maximum occupancy time ($T_{mcot,p}$) of the eNB or UE defined in the channel access priority class (p) is greater than the time ($T_j$) defined by the regional or national regulation, the eNB determines that the unlicensed band channel is an idle channel, through a channel sensing operation performed during the channel sensing duration 535 set according to the channel access priority class (p), and then defines that the sum of the initial channel occupancy time 540, the additional channel sensing duration 550 ($T_{js}$) and the additional channel occupancy time 560 cannot exceed $1000 \cdot T_{mcot} + (\text{ceil}(T_{mcot}/T_j) - 1) \cdot T_{js}$ (us) or $1000 \cdot T_{mcot} + \text{ceil}(T_{mcot}/T_j - 1) \cdot T_{js}$ (us).

Specifically, the eNB that desires to transmit a downlink control channel and a data channel to at least one UE through the unlicensed band channel, or the UE that desires to transmit an uplink control channel or a data channel to eNB through the unlicensed band channel, establishes the channel access priority class (p) defined according to the control channel or data channel to be transmitted (or according to the type of information to be sent, e.g., VoIP, FTP, or the like).

Also, if the size of a signal received from the eNB or UE during the channel sensing duration 535 formed of the defer duration 510 defined according to the channel access priority class (p) and the N additional channel sensing slots 530 selected randomly in the contention window defined according to the channel access priority class (p) does not exceed the energy detection threshold ($X_{thresh}$), e.g., $-62$ dBm or $-72$ dBm, the eNB or UE may determine that the channel is in an idle state. At this time, the defer duration 510 may include the idle slot duration 515 having the length of, for example, 16 us and $m_p$ channel sensing slots 520. Each of the channel sensing slots 520 may have the length of, for example, 9 us.

Also, the eNB or UE may occupy the unlicensed band channel and transmit a downlink signal or an uplink signal to the UE or eNB. In this case, the eNB or UE may continuously occupy the unlicensed band and transmit a signal during the minimum time between the maximum channel occupancy time ($T_{mcot,p}$) defined according to the channel access priority class and the time ($T_j=4$ ms for Japan) defined according to regions or nations as to the unlicensed band.

If the maximum occupancy time ($T_{mcot,p}=8$ ms or $T_{mcot,p}=10$ ms) of the eNB or UE defined in the channel access priority class (p) is greater than the time ($T_j=4$ ms) defined by the regional or national regulation, the eNB may occupy the channel and transmit a signal during the time 540 ($T_j=4$ ms) defined by the regional or national regulation. Then, after the initial channel occupancy time 540 (or the first channel occupancy time) corresponding to the time 540 ($T_j=4$ ms) defined by the regional or national regulation, the eNB or UE may perform again a channel sensing operation in the additional channel sensing duration 550 ($T_{js}=34$ us). If the size of a signal received during the channel sensing duration 550 does not exceed the energy detection threshold ($X_{thresh}$), e.g., $-62$ dBm or $-72$ dBm, the eNB may determine that the channel is in an idle state, and further occupy the channel.

In this case, after the unlicensed band channel is determined as an idle channel in the channel sensing duration 535 according to the channel access priority class (p), the sum of the initial channel occupancy time 540, the additional channel sensing duration 550 and the additional channel occupancy time 560 is defined so as not to exceed $1000 \cdot T_{mcot} + (\text{ceil}(T_{mcot}/T_j) - 1) \cdot T_{js}$ (us) or $1000 \cdot T_{mcot} + \text{ceil}(T_{mcot}/T_j - 1) \cdot T_{js}$ (us). In this case, if the maximum occupancy time ($T_{mcot,p}$) of the eNB or UE defined in the channel access priority class (p) is 8 ms ($T_{mcot,p}=8$ ms) and if the maximum occupancy time ($T_{mcot,p}$) is greater than the time ($T_j=4$ ms) defined by the regional or national regulation, the sum of the initial channel occupancy time 540, the additional channel sensing duration 550 and the additional channel occupancy time 560 after the unlicensed band channel is determined as an idle channel in the channel sensing duration 535 according to the channel access priority class (p) becomes $1000 \cdot T_{mcot} + \text{ceil}(T_{mcot}/T_j - 1) \cdot T_{js}$, which is obtained as $1000*8$ (us)$+\text{ceil}(8/4-1)*34$ (us), namely, $8000+34$ (us).

In this case, the additional channel sensing duration 550 may apply at least one method between a channel sensing operation in the same way as a $m_p$ value is 2 in defer duration ($T_d$) 510 of FIG. 5 and a channel sensing operation in one continuous duration such as the additional channel sensing duration 350 of FIG. 3. For example, the additional channel sensing duration 550 may include the idle slot duration 555 having the length of 16 us and the two channel sensing slots 557 (2*9 us).

If the maximum channel occupancy time ($T_{mcot,p}$) defined according to the channel access priority class (p) is 10 ms, it is possible to maximally utilize the maximum channel occupancy time, 10 ms, defined according to the channel access priority class (p) through two channel sensing durations 535 and 550 and two channel occupancies, the initial channel occupancy time 540 and the additional channel occupancy time 560 by applying the above method.

Figure 6:
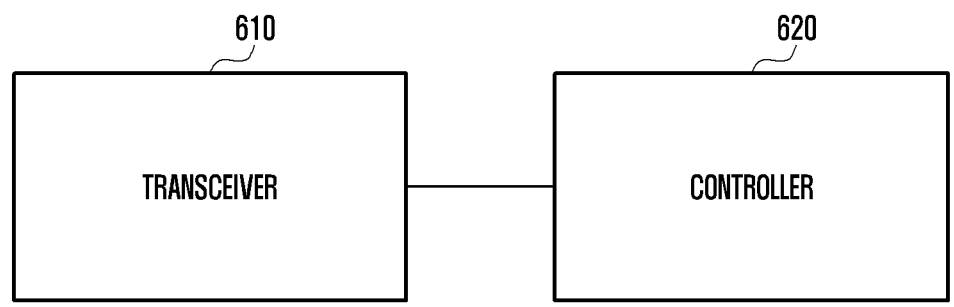
FIG. 6 is a block diagram illustrating a structure of user equipment (UE) according to an embodiment of the present disclosure.

FIG. 6 is a block diagram illustrating a structure of UE according to an embodiment of the present disclosure.

Referring to FIG. 6, the UE according to an embodiment of the present disclosure may include a transceiver 610 and a controller 620.

The transceiver 610 may transmit and/or receive a signal to or from other network entities.

The controller 620 may control the UE to perform operations discussed in the above embodiments. For example, the controller 620 may control the transceiver 610 to receive data from eNB through a licensed band, and if an unlicensed band channel is in an idle state during a first channel sensing duration, to control the transceiver 610 to receive data from the eNB through an unlicensed band during a first channel occupying duration, a second channel sensing duration, and a second channel occupying duration.

Meanwhile, the controller 620 and the transceiver 610 are not necessarily implemented as separate devices, but may be implemented as a single unit in the form of a single chip. In addition, the controller 620 and the transceiver 610 may be electrically connected to each other.

Additionally, for example, the controller 620 may be a circuit, an application-specific circuit, or at least one processor. In addition, the operations of the UE may be realized by providing a memory unit for storing a corresponding program code to the UE. That is, the controller 620 may execute the above-described operations by reading and executing the program code stored in the memory unit by a processor or a central processing unit (CPU).

Figure 7:
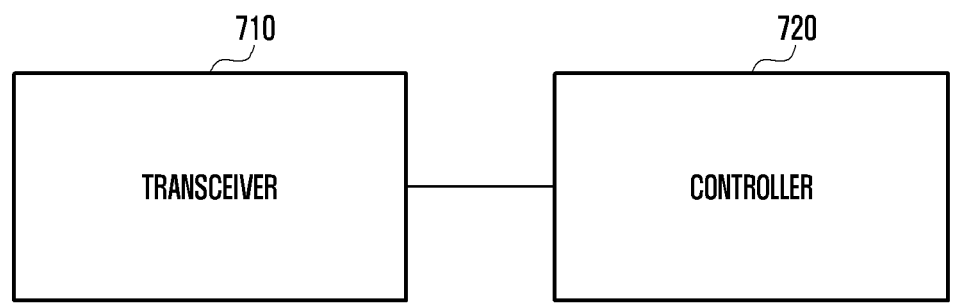
FIG. 7 is a block diagram illustrating a structure of evolved NodeB (eNB) according to an embodiment of the present disclosure.

FIG. 7 is a block diagram illustrating a structure of eNB according to an embodiment of the present disclosure.

Referring to FIG. 7, the eNB according to an embodiment of the present disclosure may include a transceiver 710 and a controller 720 (at least one processor).

The transceiver 710 may transmit and/or receive a signal to or from other network entities.

The controller 720 may control the eNB to perform operations discussed in the above embodiments. For example, the controller 720 may control the transceiver 710 to transmit data to UE through a licensed band, to determine whether an unlicensed band channel is in an idle state during a first channel sensing duration, and if the unlicensed band channel is in the idle state, to control the transceiver 710 to transmit data to the UE through an unlicensed band during a first channel occupying duration, a second channel sensing duration, and a second channel occupying duration.

Meanwhile, the controller 720 and the transceiver 710 are not necessarily implemented as separate devices, but may be implemented as a single unit in the form of a single chip. In addition, the controller 720 and the transceiver 710 may be electrically connected to each other.

Additionally, for example, the controller 720 may be a circuit, an application-specific circuit, or at least one processor. In addition, the operations of the eNB may be realized by providing a memory unit for storing a corresponding program code to the eNB. That is, the controller 720 may execute the above-described operations by reading and executing the program code stored in the memory unit by a processor or a central processing unit (CPU).

The various elements, modules, etc. of entities, such as eNB or UE, disclosed herein may be implemented in a hardware circuit, e.g., a complementary metal oxide semiconductor based logic circuit, firmware, software, and/or a combination thereof embedded in a machine-readable medium. In one example, the various electrical structures and methods may be implemented using electrical circuits such as transistors, logic gates, and custom semiconductors.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a base station, the method comprising:
   determining whether an unlicensed band channel of an unlicensed band is in an idle state during a first channel sensing duration according to a channel access priority class;
   transmitting data to a terminal through the unlicensed band during a first channel occupying duration, in case that the unlicensed band channel of the unlicensed band is in the idle state during the first channel sensing duration;
   identifying that the first channel occupying duration is less than a maximum occupancy time possible for the base station or the terminal to continuously occupy the unlicensed band according to the channel access priority class, and the first channel occupying duration is equal to an actual occupancy time allowed for the base station or the terminal to continuously occupy the unlicensed band according to a regional policy or a national policy;
   determining whether the unlicensed band channel of the unlicensed band is an idle state during a second channel sensing duration; and
   transmitting the data to the terminal through the unlicensed band during a second channel occupying duration, in case that the unlicensed band channel of the unlicensed band is in the idle state during the second channel sensing duration,
   wherein a sum of the first channel occupying duration, the second channel sensing duration, and the second channel occupying duration is equal to or less than a certain time determined based on a rounding up value of a result of a calculation between the maximum occupancy time and the actual occupancy time.

2. The method of claim 1, wherein the channel access priority class includes 3 or 4.

3. The method of claim 1, wherein the calculation includes dividing the maximum occupancy time by the actual occupancy time and then subtracting one.

4. The method of claim 1,
   wherein the certain time is determined according to $1000 \cdot T_{mcot} + \text{ceil}(T_{mcot}/T_j - 1) \cdot T_{js}$ (µs),
   wherein $T_{mcot}$ denotes the maximum occupancy time possible for the base station or the terminal to continuously occupy the unlicensed band,
   wherein $T_j$ denotes the actual occupancy time allowed for the base station or the terminal to continuously occupy the unlicensed band, and
   wherein $T_{js}$ denotes a length of the second channel sensing duration.

5. The method of claim 1, wherein the second channel sensing duration includes:
   an idle slot duration including 16 µs, and
   two channel sensing slot durations each including 9 µs.

6. A method performed by a terminal, the method comprising:
   receiving data from a base station through an unlicensed band during a first channel occupying duration, in case that an unlicensed band channel of the unlicensed band is in an idle state during a first channel sensing duration according to a channel access priority class; and
   receiving, when the first channel occupying duration is less than a maximum occupancy time possible for the base station or the terminal to continuously occupy the unlicensed band according to the channel access priority class and the first channel occupying duration is equal to an actual occupancy time allowed for the base station or the terminal to continuously occupy the unlicensed band according to a regional policy or a national policy, the data from the base station through the unlicensed band during a second channel occupying duration, in case that the unlicensed band channel of the unlicensed band is in an idle state during a second channel sensing duration,
   wherein a sum of the first channel occupying duration, the second channel sensing duration, and the second channel occupying duration is equal to or less than a certain time determined based on a rounding up value of a result of a calculation between the maximum occupancy time and the actual occupancy time.

7. The method of claim 6, wherein the channel access priority class includes 3 or 4.

8. The method of claim 6, wherein the calculation includes dividing the maximum occupancy time by the actual occupancy time and then subtracting one.

9. The method of claim 6,
wherein the certain time is determined according to $1000 \cdot T_{mcot} + \text{ceil}(T_{mcot}/T_j - 1) \cdot T_{js}$ (μs),
wherein $T_{mcot}$ denotes the maximum occupancy time possible for the base station or the terminal to continuously occupy the unlicensed band,
wherein $T_j$ denotes the actual occupancy time allowed for the base station or the terminal to continuously occupy the unlicensed band, and
wherein $T_{js}$ denotes a length of the second channel sensing duration.

10. The method of claim 6, wherein the second channel sensing duration includes:
an idle slot duration including 16 μs, and
two channel sensing slot durations each including 9 μs.

11. A base station in a wireless communication system, the base station comprising:
a transceiver; and
a controller configured to:
determine whether an unlicensed band channel of an unlicensed band is in an idle state during a first channel sensing duration according to a channel access priority class,
control the transceiver to transmit data to a terminal through the unlicensed band during a first channel occupying duration, in case that the unlicensed band channel of the unlicensed band is in the idle state during the first channel sensing duration,
identify that the first channel occupying duration is less than a maximum occupancy time possible for the base station or the terminal to continuously occupy the unlicensed band according to the channel access priority class, and the first channel occupying duration is equal to an actual occupancy time allowed for the base station or the terminal to continuously occupy the unlicensed band according to a regional policy or a national policy,
determine, whether the unlicensed band channel of the unlicensed band is an idle state during a second channel sensing duration, and
control the transceiver to transmit the data to the terminal through the unlicensed band during a second channel occupying duration, in case that the unlicensed band channel of the unlicensed band is in the idle state during the second channel sensing duration,
wherein a sum of the first channel occupying duration, the second channel sensing duration, and the second channel occupying duration is equal to or less than a certain time determined based on a rounding up value of a result of a calculation between the maximum occupancy time and the actual occupancy time.

12. The base station of claim 11, wherein the channel access priority class includes 3 or 4.

13. The base station of claim 11, wherein the calculation includes dividing the maximum occupancy time by the actual occupancy time and then subtracting one.

14. The base station of claim 11,
wherein the certain time is determined according to $1000 \cdot T_{mcot} + \text{ceil}(T_{mcot}/T_j - 1) \cdot T_{js}$ (μs),
wherein $T_{mcot}$ denotes the maximum occupancy time possible for the base station or the terminal to continuously occupy the unlicensed band,
wherein $T_j$ denotes the actual occupancy time allowed for the base station or the terminal to continuously occupy the unlicensed band, and
wherein $T_{js}$ denotes a length of the second channel sensing duration.

15. The base station of claim 11, wherein the second channel sensing duration includes:
an idle slot duration including 16 μs, and
two channel sensing slot durations each including 9 μs.

16. A terminal in a wireless communication system, the terminal comprising:
a transceiver; and
a controller configured to:
control the transceiver to receive data from a base station through an unlicensed band during a first channel occupying duration, in case that an unlicensed band channel of the unlicensed band is in an idle state during a first channel sensing duration according to a channel access priority class, and
control the transceiver to receive, when the first channel occupying duration is less than a maximum occupancy time possible for the base station or the terminal to continuously occupy the unlicensed band according to the channel access priority class and the first channel occupying duration is equal to an actual occupancy time allowed for the base station or the terminal to continuously occupy the unlicensed band according to a regional policy or a national policy, the data from the base station through the unlicensed band during a second channel occupying duration, in case that the unlicensed band channel of the unlicensed band is in an idle state during a second channel sensing duration,
wherein a sum of the first channel occupying duration, the second channel sensing duration, and the second channel occupying duration is equal to or less than a certain time determined based on a rounding up value of a result of a calculation between the maximum occupancy time and the actual occupancy time.

17. The terminal of claim 16, wherein the calculation includes dividing the maximum occupancy time by the actual occupancy time and then subtracting one.

18. The terminal of claim 16,
wherein the certain time is determined according to $1000 \cdot T_{mcot} + \text{ceil}(T_{mcot}/T_j - 1) \cdot T_{js}$ (μs),
wherein $T_{mcot}$ denotes the maximum occupancy time possible for the base station or the terminal to continuously occupy the unlicensed band,
wherein $T_j$ denotes the actual occupancy time allowed for the base station or the terminal to continuously occupy the unlicensed band, and
wherein $T_{js}$ denotes a length of the second channel sensing duration.

19. The terminal of claim 16, wherein the second channel sensing duration includes:
an idle slot duration including 16 us, and
two channel sensing slot durations each including 9 us.

20. The terminal of claim 16, wherein the channel access priority class includes 3 or 4.

\* \* \* \* \*